UNITED STATES PATENT OFFICE.

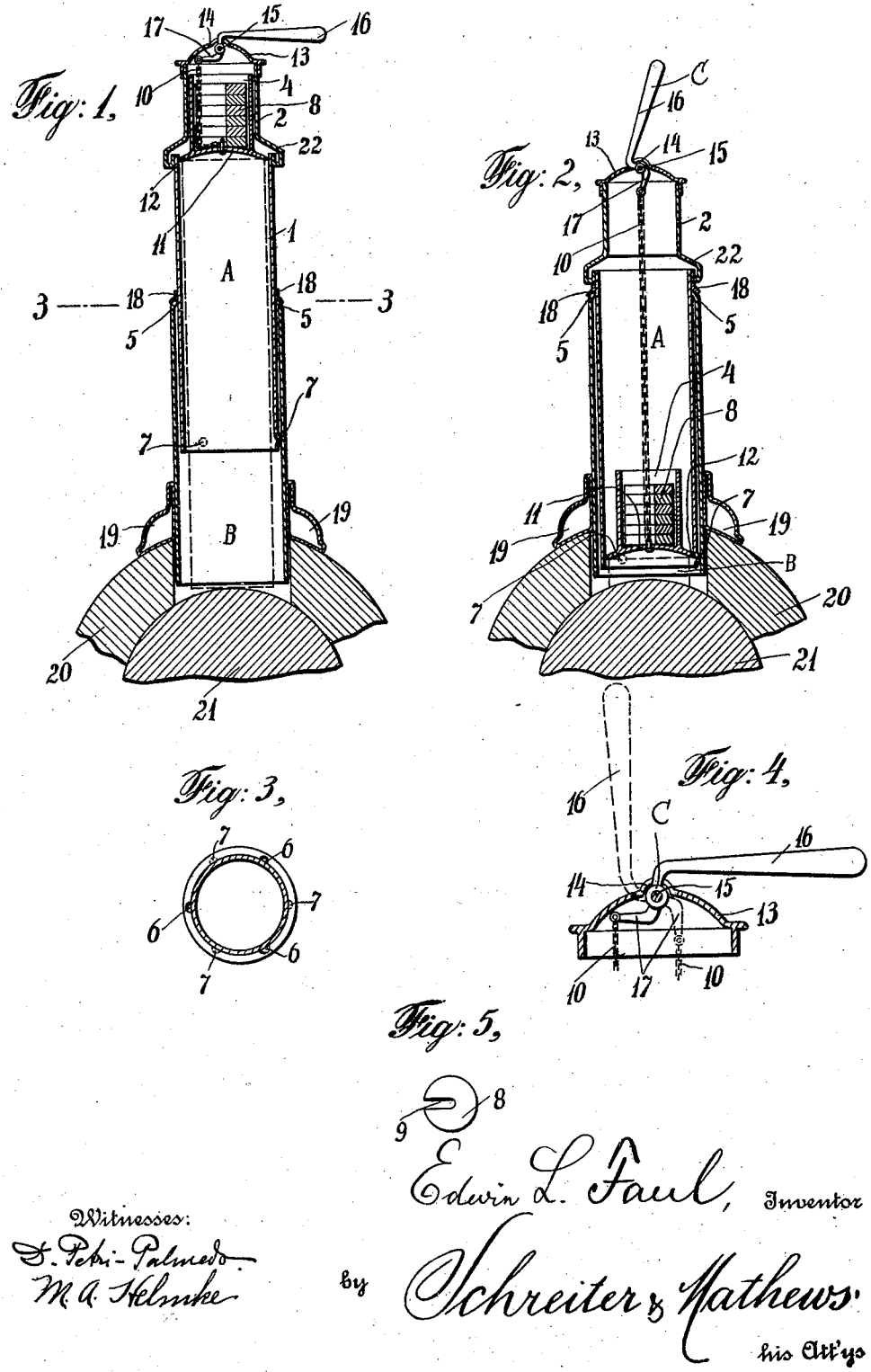

EDWIN L. FAUL, OF NEW YORK, N. Y., ASSIGNOR TO WILLIAM J. FAUL CO., OF NEW YORK, N. Y., A CORPORATION OF NEW YORK.

CANDLESTICK-LUBRICATOR.

No. 928,861.        Specification of Letters Patent.        Patented July 20, 1909.

Application filed October 31, 1908. Serial No. 460,521.

*To all whom it may concern:*

Be it known that I, EDWIN L. FAUL, a citizen of the United States, and a resident of the city of New York, borough of Brooklyn, county of Kings, and State of New York, have invented new and useful Improvements in Candlestick-Lubricators, of which the following is a specification, reference being had to the accompanying drawings, wherein—

Figure 1 is a longitudinal sectional view of my improved candlestick lubricator, showing the relative positions of its parts at the beginning or early stage of its operation; Fig. 2 a similar view thereof showing the follower fully descended into the lubricator tube and the relative positions of the parts when the lubricant is nearly consumed; Fig. 3 is a sectional view on line 3—3 indicated in Fig. 1; the protuberance in the follower tube being indicated in dotted lines; Fig. 4 is a detail view of the cover and upper part of the follower showing the indicator combined therewith; and Fig. 5 a plan view of a section of weight used in my improved lubricator.

My invention relates to that kind of lubricators, designated in the art as "candlestick lubricators" and consists of the improved construction thereof as hereinafter more fully described with reference to the drawings, and in the combination therewith of a device for signaling when the charge of the lubricant in the lubricator is nearly consumed.

The so-called "candlestick lubricators" are now employed extensively for lubricating rapidly revolving shafts and are preferred for that purpose to other kinds of lubricators. There is, however, this difficulty with such lubricators, as they have been heretofore constructed, that only a comparatively short stick of lubricant (not over 2½ inches long) can be accommodated therein, and that it is not well feasible to enlarge the diameter thereof, in fact is not desirable to be done, as it would result in wasting of the lubricant. The dimensions of the lubricator cannot be increased longitudinally, as that would prevent the use of the lubricator in most places where it is now used, on account of the limited space available for setting up such lubricators on the bearings wherein such shafts rotate. By the improvements I devised in the construction of such lubricators, its capacity is enlarged without increasing its dimensions, and the attendance and labor in refilling are reduced. To this end I construct the follower A of such a lubricator of two parts, designated respectively 1 and 2 in the drawings. The diameter of the part 1 is made somewhat smaller than the interior diameter of the tube B and is provided near its lower edge with protuberances 7. Tube B is made sufficiently wide, interiorly, to permit its upper rim 5 to be slightly offset, to reduce the aperture therein to the outer diameter of the part 1 of the follower A. Three or more notches 6 are cut in the offset rim extending the whole width or depth thereof. These are located correspondingly to the protuberances 7 to permit the inserting of part 1 of the follower A in the rim 5 of the tube B. The object of this arrangement is to maintain the follower A in concentric position with the tube B, the protuberances 7 abutting against the interior wall of tube B when the follower is inserted therein, whereby a smooth operation of the lubricator is secured, the protuberances 7 preventing the wedging of the parts. By giving follower A a slight turn to one side, after it is inserted in the tube B, the protuberances 7 also hold the follower A locked within it. A circular cover or flange 18 may be fitted on the part 1 of follower A, to cover the joint between it and the tube B, and particularly the notches 6, so as to prevent dust from entering into it.

The interior diameter of part 1 of the follower A is made sufficiently large to freely accommodate a stick of lubricant to slide therein freely without friction, and may be made as long as the tube B, whereby the capacity of the lubricator would be doubled, while the total length thereof as compared with the construction of such candlestick lubricators as heretofore used, would be only slightly increased, the whole difference in length being only the length of the part 2, which need not be more than one-fourth of the length of the follower required in such lubricators as used heretofore. The other part 2 of the follower A may be made of yet smaller diameter, just sufficient to accommodate the weight-box 4. On its upper end cover 13 is removably secured to the part 2 of the follower A, preferably by a bayonet-joint, and the weight-box 4 is connected thereto by a chain 10 or the like. For better convenience in manufacture, each of the two parts of the follower A is made separately, though the operation of the device does not require it; the lower part 1 is made by cutting a suitable length of a plain tube, opened on both ends and the upper part 2 of a piece of a similar tubing, expanded at its lower end as shown in Fig. 1 to facilitate the joining of the parts together. The parts may be joined together permanently (soldered) or only so as to permit their being taken apart. The joint of the two parts may be made by offsetting outwardly the upper rim of the part 1 and then, after pushing them together, offsetting inwardly, the expended bottom part of part 2. If the parts are joined, as above explained, by offsetting their adjoining rims, the annular shoulder 22 is formed thereby; if joined together otherwise, such an annular shoulder as shown at 22 must be provided at the joint to arrest further downward motion of the follower, into the tube B as the lubricant is being consumed.

The weight-box 4 is made of a piece of tubing of smaller diameter exteriorly than the interior diameter of the part 2 of the follower A, and serves for holding the weights 8 employed to act upon the stick of lubricator to keep it in contact with the shaft. These weights are made in sections, shaped as shown in Fig. 5 in plan view, and of such diameter to permit their being readily dropped into the weight-box 4. By increasing or reducing the number of these weights in the weight-box, the lubricating of the shaft is regulated. The upper end of the weight-box 4 is open and its lower end is closed by an inverted hood 11, fitted to slide freely in the part 1 of the follower A. The flaring flange 12 of this hood is designed to embrace and sit upon the top end of the stick of lubricator (indicated in dotted lines in Figs. 1 and 2). Slots 9 in the weights 8 are provided to prevent interference with the movements of chain 10, connecting box 4 with cover 13.

The circular flange or shoulder 19 on tube B is provided to support the lubricator upon the bearing 20 and to prevent tube B from coming in contact with the shaft 21. This is particularly desirable, where the bore in the bearing, wherein the tube B is inserted, is larger than its outer diameter. It is preferable to make this flange or shoulder 19 apart from the tube B and have it fitted snugly on the tube B. By these means, the lubricator may be fitted by correspondingly adjusting flange 19 upon tube B to bearings of various thicknesses.

In candlestick lubricators as were heretofore in use, the follower served also as an indicator of the consumption of the lubricant, or, rather to show that the lubricant is wholly consumed when the follower was descended entirely into the tube. In my improved lubricator such indicator may be provided as shown in Figs. 1 and 2, and in Fig. 4 in detail. In the center of the cover 13, there is made an opening 14, wherein a crosspin 15 is set and thereon a double-armed indicator lever C is mounted to freely oscillate. The longer arm 16 of this lever is located above and the shorter arm 17 underneath the cover 13 and above the weight-box 4. The chain 10, whereon the weight-box 4 is suspended, is attached to the free end of this shorter arm 17. Chain 10 is made long enough to permit the weight-box 4 to descend to within about an inch of the lower end of part 1 of the follower A before the chain is taut and the weight of the box begins to act thereon. As the weight-box continues to descend farther, as the lubricant is being consumed, its weight begins to act on the short arm of lever 17 pulling it down, whereby the longer arm 16 of the lever is raised. The length of the chain and of the shorter arm 17 of the double-armed lever C are so calculated that the longer arm 16 of this lever will be brought into an upright position as indicated in dotted lines in Fig. 4, before the last part of the lubricant is consumed. In this manner the attendant or oiler is informed before the lubricant is entirely consumed, that the supply of the lubricant should be replenished.

My improved lubricator is used and operates as follows: After being set in the bore in bearing 20 of the shaft 21 to be lubricated, the follower A is withdrawn from tube B and a stick of lubricant is inserted in the tube B. Then the follower A is set upon the end of the stick projecting from the box B. When doing this the protuberances 7 are set in alinement with the notches 6 and after the follower is set into the tube B, it is slightly turned to one side, to move protuberances 7 out of alinement with the notches 6 and then pushed in as far as it will go. By this the weight-box 4 is pushed up in the position shown in Fig. 1 and the lubricator is set in action. The weight-box 4 acts upon the stick of lubricant to press it upon the shaft 21 and as the lubricant is being melted and consumed by the frictional contact with the shaft 21, the stick, pressed upon by the weight-box, slides through tube B until shoulder 22 of the follower A abuts against the cover 18 (or the offset upper rim 5 of the tube B), the lower rim of the follower A being then some distance above the level of the lower end of tube B. The pressure, exerted on it by the weight-box then causes the remainder of the stick of lubricant to slide from the lower part 1 of the follower A as it was before driven from the tube B. This action will continue until the further downward motion of the weight-box, some distance, approximately one-half inch, above the surface of the shaft 21. Then if the lubricator is provided with the indicating device above described, the indicating device will operate, to show that the supply of lubricant is nearly exhausted.

One advantage of my improved lubricator is, that it enables the use of a greater, longer lasting supply of lubricant without requiring a corresponding increase of the length of the lubricator. An increase in the capacity of such candlestick lubricators was desired for a long time, mainly owing to the fact, that candlestick lubricators are preferred to oil cups and other similar devices for lubricating rapidly revolving shafts. This could not be done by increasing the dimensions of the lubricators, owing to the circumstance that the space where such lubricators are used, is limited. By the means hereinbefore set forth, the capacity of the lubricator may be increased even more than two-fold, without increasing the length of the lubricator when fully charged, and thus extends the use of such improved lubricator of a greatly increased capacity to such apparatus where the lubricators heretofore known could not be employed.

I claim as my invention:

1. A lubricator comprising a tube, a follower, fitted to contain a stick of lubricant, slidably mounted in the tube; a weight-box in the follower and fitted to freely slide therein; a cover on the follower and means for flexibly connecting the weight-box with the cover to arrest the further motion of the weight-box when it reaches a predetermined point above the bottom rim of the follower.

2. A lubricator comprising a tube, a follower, fitted to contain a stick of lubricant, slidably mounted in the tube; means for maintaining the follower in alinement with the tube; a weight-box in the follower and fitted to freely slide therein; a cover on the follower and means for flexibly connecting the weight-box with the cover to arrest the further motion of the weight-box when it reaches a predetermined point above the bottom rim of the follower.

3. A lubricator comprising a tube, a follower, fitted to contain a stick of lubricant, slidably mounted in the tube; means for maintaining the follower in alinement with the tube; a weight-box in the follower and fitted to freely slide therein; a cover on the follower; a signaling device mounted in the cover; a chain connecting the signaling device with the weight-box to set the signaling device in action when the weight-box reaches the predetermined terminus of its motion.

4. In a candlestick lubricator, the combination of a tube, a follower in the tube; a signaling device, substantially as herein shown and described, mounted thereon; a weight-box, fitted to freely slide in the follower, and means, for arresting the descending motion of the weight-box at a predetermined point, operatively connecting the weight-box with the signaling device, so as to actuate the latter when the weight-box reaches the predetermined terminus of its motion.

EDWIN L. FAUL.

Witnesses:
ROBERT A. PIPER,
M. A. HELMKE.